Feb. 25, 1947. S. GODET 2,416,579
FOLLOW-UP CONTROL SYSTEM
Filed March 1, 1943
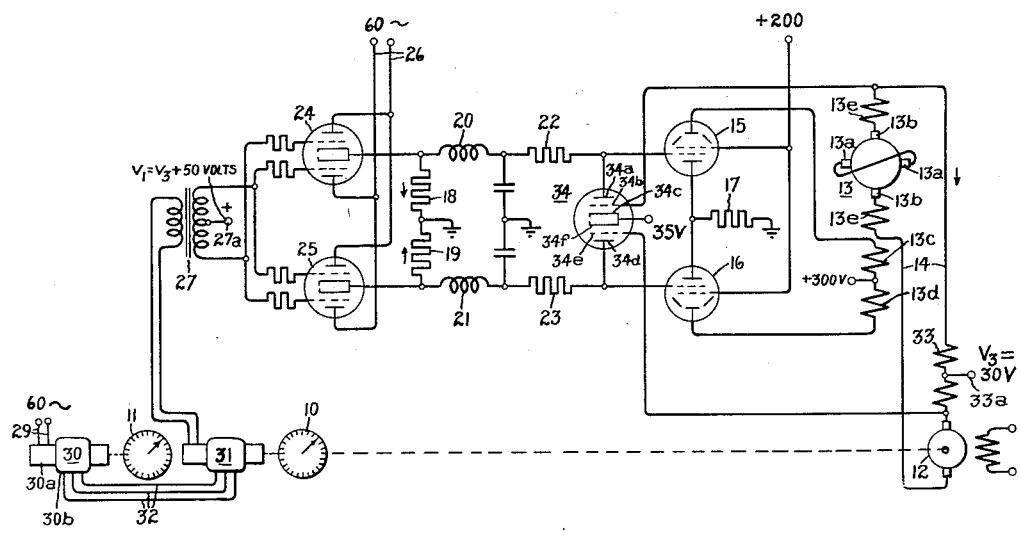
Inventor:
Sidney Godet,
by Harry E. Dunham
His Attorney.

Patented Feb. 25, 1947

2,416,579

UNITED STATES PATENT OFFICE 2,416,579

FOLLOW-UP CONTROL SYSTEM

Sidney Godet, Albany, N. Y., assignor to General Electric Company, a corporation of New York Application March 1, 1943, Serial No. 477,509

5 Claims. (Cl. 172—239)

This invention relates to control systems, more particularly to follow-up control systems and it has for an object the provision of a simple, reliable and improved control system of this character.

Another and more specific object of this invention is the provision of a simple and inexpensive means for limiting the maximum torque that can be exerted by the follow-up motor.

In carrying the invention into effect in one form thereof, means responsive to the error of the system are provided for supplying a signal voltage to the input circuit of a suitable electric valve type amplifier, to control the current supplied to the follow-up motor. A voltage drop device is connected in the armature circuit of the motor. The output circuit of a second electric valve is connected to the input circuit of the amplifier and the input circuit of this second electric valve is connected across the voltage drop device in the armature circuit of the follow-up motor. At a predetermined value of armature current, this electric valve responds to reduce the voltage impressed upon the input circuit of the amplifier and thus to limit the torque that can be exerted by the follow-up motor to a predetermined value.

For a better and more complete understanding of the invention reference should now be had to the following specification and to the accompanying drawing, the single figure of which is a simple diagrammatical representation of an embodiment of the invention.

Referring now to the drawing, an object 10 is to be driven into positional agreement with a pilot device or director 11 by suitable driving means such, for example, as represented by the direct current motor 12 to the drive shaft of which the object 10 is connected by means of suitable reduction gearing (not shown). Direct current is supplied to the armature of the motor 12 by means of a special generator 13 having a pair of short-circuited armature brushes 13a and a pair of load brushes 13b to which the armature of the motor 12 is connected by means of conductors 14. The generator 13 is an armature reaction excited dynamoelectric machine and is driven at a speed, which is preferably substantially constant, by any suitable driving means such, for example, as an induction motor (not shown). The axis of the magnetic flux which is produced by the short-circuited armature brushes 13a is referred to as the short-circuit axis, and the axis which is displaced 90 electrical degrees from the short-circuit axis is referred to as the control axis. The net flux along the control axis is produced by two opposing control field windings 13c and 13d, a series compensating field winding 13e and the armature reaction of the load current itself. The flux along the short-circuit axis of machine 13 is produced by the armature reaction of the short-circuit current. This short-circuit axis flux generates the voltage which appears across the load brushes 13b and the control axis flux produces a voltage which appears across the short-circuited brushes 13a and causes short-circuit current to flow.

The compensating field winding 13e is so designed and connected that it neutralizes the armature reaction produced by the load current substantially 100 per cent. Consequently, the main control field windings 13c and 13d are only required to produce the amount of flux necessary to cause current to flow in the short circuit. Since the resistance of the short circuit is so low as to be almost negligible, the control field windings 13c and 13d are only required to produce a very small flux in order to produce a large current in the short circuit and a correspondingly large armature flux. Furthermore, since the flux of the control field windings need only build up to such a low value, and since the reactance of the short-circuited armature is very low, full load current in the short-circuit axis will be obtained in an exceptionally short time. The important characteristics of this armature reaction excited machine 13 are its exceptionally high speed of response, and its exceedingly high amplification factor, i. e. the ratio between the magnitude of the current flowing in the control field winding 13e or 13d and the magnitude of the current which flows in the output circuit of the machine.

Control field windings 13c and 13d on the control axis of the armature reaction generator 13 are connected in the cathode-anode circuit of electric valves 15 and 16 which constitute a single-stage amplifier. Although electric valves 15 and 16 may be of any suitable type, they are preferably beam power type valves connected for push-pull operation, and provided with a self-biasing resistor 17. Fixed voltages of the magnitude and polarity indicated are applied to the screen grids and anodes of the valves 15 and 16 by suitable means such, for example, as a voltage divider (not shown) across a source of direct voltage. The cathode-anode circuits of valves 15 and 16 are traced from the ground connection, which may be assumed to be the negative terminal of the voltage divider, through the self-biasing cathode follower resistor 17, through the valves 15 and 16 in parallel and the differentially wound field windings 13c and 13d in parallel to a point on the voltage divider having a voltage of suitable magnitude such, for example, as 300 volts positive. The cathode grid circuits of valves 15 and 16 are traced from the negative or ground terminal of the voltage divider through the resistors 18 and 19 in parallel, the choke coils 20 and 21, and suitable voltage drop devices illustrated as resistors 22 and 23 to the control grids of valves 15 and 16 and from the cathode through the cathode follower resistor 17 to the ground or negative terminal of the voltage divider. The voltages of the control grids, respectively of the valves 15 and 16, as a result of the inclusion of the biasing resistor 17 in the anode-cathode circuits of valves 15 and 16, are such that both valves 15 and 16 normally conduct current but the grids do not and the circuit constants are preferably so chosen that these valves normally conduct equal amounts of current. This condition of equal conduction in both valves 15 and 16 occurs when the follow-up system is in correspondence, i. e. when the driven object 10 is in positional agreement with the pilot device 11. The currents conducted by the valves 15 and 16 excite the control field windings 13c and 13d of the armature reaction excited generator 13. However, since the control field windings 13c and 13d act in opposition to each other, the net exciting flux along the control axis of the generator 13 is zero and therefore the voltage of the load brushes 13b is zero.

In order to vary the bias voltage of the grids of valves 15 and 16, an additional pair of electric valves 24 and 25 are provided for varying the voltage drops across the resistors 18 and 19 which are included in the cathode-grid or input circuits of the valves 15 and 16. The valves 24 and 25 are illustrated as twin triode type electric valves as being connected for duplex or balanced operation. As illustrated, the valves 24 and 25 are energized from a source of alternating voltage such as represented by the two supply lines 26, the center point of which is returned to point 27a and the anodes of both conducting paths of each valve are connected to opposite sides of the source so that each valve serves as a full-wave rectifier. One control grid of each of the valves 24 and 25 is connected to the upper terminal of the center tapped secondary winding of transformer 27 and the other two grids of the valves 24 and 25 are connected to the opposite terminal of the center tapped secondary winding. The center tap itself is connected to a point on the voltage divider which is positive with respect to the voltage of the cathode return. As a result, when no voltage is supplied to the primary winding of transformer 27, the voltages of all four grids of valves 24 and 25 are equally positive and the valves 24 and 25 supply currents of equal magnitude to the resistors 18 and 19 in the direction indicated by the arrows. As a result of the voltage drop across resistors 18 and 19, equal positive voltages are applied to the control grids of valves 15 and 16 and equal currents are supplied in opposite direction to the field windings 13c and 13d of the armature reaction excited generator 13.

For the purpose of varying the voltages on the control grids of the electric valves 24 and 25, an alternating voltage of a variable maximum value is supplied to the grid circuit of valves 24 and 25 substantially in phase with the alternating voltage which is supplied to the anodes. This alternating voltage is supplied through the transformer 27, whose primary winding is connected to the single-phase alternating current source 29 through rotary induction apparatus illustrated as comprising a rotary induction device 30 referred to as the transmitter and a similar rotary induction device 31 referred to as the receiver regulator. The rotary induction device 30 comprises a rotor member 30a provided with a single-phase primary winding (not shown) and a stator member 30b provided with a distributed three-element winding (not shown) which is physically similar to the polyphase winding of an ordinary wound rotor induction motor. The stator and rotor windings are arranged in inductive relationship with each other so that the alternating magnetic field produced by the current flowing in the primary winding induces voltages in the elements of the secondary winding. The receiver regulator 31 is in all respects identical with the transmitter 30 and the terminals of its stator winding are connected to the terminals of the stator winding of the transmitter by means of conductors 32 so that the voltages induced in the stator winding of the transmitter cause currents to flow in the stator winding of the receiver regulator, thereby producing a magnetic field similar to the magnetic field produced by the current flowing in the rotor winding of the transmitter.

The rotor of the transmitter 30 is mechanically connected through suitable gearing (not shown) to the movable element of the pilot device 11. This gearing may have any desired ratio. It is assumed, however, for the purpose of simplicity, that the ratio is 1:1. The rotor of the receiver regulator 31 is connected to the shaft of the motor 12 and also to the shaft of the driven object 10 by means of suitable gearing (not shown) having the same ratio as the gearing between the pilot device and the transmitter.

The initial relative arrangement of the rotors of the transmitter 30 and the receiver regulator 31 is such that when the system is in correspondence, the axis of the rotor winding of the receiver 31 is at right angles to the axis of the magnetic field produced by the currents flowing in the stator winding so that the voltage induced in the rotor winding is zero. Rotation of the rotor member of the transmitter causes a voltage to be induced in the rotor winding of the receiver regulator owing to the shift in the position of the axis of the magnetic field of the receiver relative to the axis of the coil of the rotor member, and the magnitude of this induced voltage depends upon the relationship of the axis of this winding to the axis of the magnetic field, e. g. when the axes of the magnetic field and of the rotor winding are parallel, the induced voltage is maximum, whereas when these axes are at right angles with each other, the induced voltage is zero. It will therefore be clear that rotation of the rotor of the transmitter or of the receiver regulator will vary the magnitude of the voltage supplied to the grid circuit of electric valves 24 and 25 which, in turn, will result in a variation in the relationship of the current flowing in the anode-cathode circuits of these valves. The connections between the grids of valves 24 and 25 are such that when the voltage supplied through the transformer 27 to the grid of one of the valves is increased, the voltage applied to the corresponding grid of the other valve is simultaneously decreased and consequently when the current supplied to one of the control field windings of the generator 13 is increased, the current supplied to the other is correspondingly decreased and the motor 12 will rotate in a direction corresponding to the direction of rotation of the pilot device.

For the purpose of limiting the torque that can be developed by the follow-up motor 12 to a maximum permissible value, additional means are provided. These means comprise the resistors 22 and 23 in the grid circuits of electric valves 15 and 16, the voltage drop device illustrated as a center tapped resistor 33 connected in series relationship in the armature circuit of the follow-up motor 12 and an electric valve 34 illustrated as a twin triode type valve. As indicated, the upper conducting path of the valve 34 has an anode 34a, a control grid 34b and a cathode 34c and the lower conducting path of the valve 34 has an anode 34d, a control grid 34e and a cathode 34f. The control grids 34b and 34d are connected to opposite terminals of the armature resistor 33. The anode 34a is connected to a point between grid resistor 22 and the grid of valve 15 and anode 34d is connected to a point between the grid resistor 23 and the control grid of valve 16. In other words, the anodes 34a and 34d are connected directly to the control grids of the valves 15 and 16 respectively. The cathodes 34c and 34f are connected to a suitable point of positive voltage such, for example, as a point on the voltage divider mentioned in the foregoing. The center tap 33a of resistor 33 is connected to a point of somewhat lower positive voltage than the point to which the cathodes 34c and 34f are connected. For example, the center tap 33a may be connected to a point having a voltage of 30 volts positive and the cathodes 34c and 34f may be connected to a point having a voltage of 35 volts positive. Thus when no current is flowing in the armature circuit of the follow-up motor, the grids 34b and 34e have a five-volt negative bias with respect to the voltage of their respective cathodes. Assuming that the valve 34 is at cutoff when the grid voltage is two-volts negative with respect to the cathode voltage, both conducting paths of valve 34 are well below cutoff when the armature current of the follow-up motor 12 is zero. The value of cutoff depends upon the anode to cathode voltage of valve 34. The anode potential is normally one or two volts higher than the potential of 27a with no signal input.

The ohmic value of resistor 33 is determined by the value to which it is desired to limit the torque of the follow-up motor. For the purpose of illustration, it is assumed that it is desired to limit the torque to a value corresponding to an armature current of 3 amperes. In this case the resistance of resistor 33 may be approximately 2 ohms, i. e., 1 ohm on either side of the center tap.

With the foregoing understanding of the elements and their organization, the operation of the system itself will be readily understood from the following description:

Rotation of the pilot device 11 in one direction from the position in which it is illustrated will cause an alternating voltage to be induced in the secondary winding 27. If the rotation of the pilot device 11 is in such a direction that the voltage of the upper terminal of the secondary winding is positive when the voltage of the left-hand conductor of source 26 is positive, the current through resistor 18 will increase and the current through resistor 19 will decrease. Consequently, the voltage of the control grid of valve 15 becomes increasingly positive and the voltage of the control grid of valve 16 becomes relatively more negative. This causes the current in the upper field winding 13c to increase and the current in the opposing field winding to decrease with the result that the generator 13 has a net excitation and supplies current to the armature of the motor 12 in the direction indicated by the arrow.

The operation of the torque limit control feature may be illustrated by assuming that the armature current has attained a value in excess of the value corresponding to the maximum permissible torque and then considering the resulting action. For example, if the armature current should rise to 5 amperes, the voltage at the upper terminal of resistor 33 becomes 35 volts and the voltage at the lower terminal becomes 25 volts. Thus, a voltage of 35 volts is applied to the grid 34b of valve 34 and, since this is more positive than the cutoff value, the upper path of valve 34 becomes conducting and current flows through the grid resistor 22 from left to right. The resulting voltage drop across resistor 22 decreases the excitation of field winding 13c so that the net excitation of generator 13 and the current supplied to the follow-up motor 12 are correspondingly decreased. This continues until the voltage of grid 34b is at the cutoff value which occurs, as explained in the foregoing, when the armature current of the follow-up motor reaches the limiting value. Thus, the limiting value of armature current Im is defined by the relationship $$I_m = \frac{V_2 - V_3 - V_c}{R}$$

in which $V_2$ = the cathode voltage of valve 34,
$V_3$ = the voltage of center tap 33a
$V_c$ = the cutoff voltage of valve 34 and
R = the resistance of one half of resistor 33.

Current in the reverse direction causes the lower conducting path of valve 34 to become conducting, but the limiting action is the same as described in the foregoing.

The resistor 33 may be external to the motor or it may be the commutating field windings of the motor if the motor has commutating field windings.

Although in accordance with the provisions of the patent statutes this invention is described as embodied in concrete form and the principle thereof has been described together with the best mode in which it is now contemplated applying that principle, it will be understood that the apparatus shown is merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A follow-up control system for driving an object into positional agreement with a pilot device comprising in combination a pair of electric valves each provided with an anode, a cathode and a control grid, means responsive to positional disagreement of said pilot device and driven object for supplying a signal voltage to said control grid to control the flow of current in the anode circuits of said valves, an electric motor responsive to said current for driving said object toward correspondence with said device, a separate resistor connected in circuit with the grid of each of said electric valves, a voltage drop device provided with a center tap connected in the armature circuit of said motor for producing a control voltage proportional to armature current, means for supplying a predetermined voltage to said center tap, a second electric valve means having a cathode, a pair of anodes respectively connected to said grids and having a pair of grids connected to terminals of said voltage drop device on opposite sides of said center tap for responding to said armature current to control said pair of electric valves to limit the current supplied to said armature and means for applying a voltage to the grid cathode circuit of said second valve means to bias said second valve means below cutoff by a predetermined amount so that the current limiting action of said second valve means is initiated only in response to an armature of a predetermined value.

2. A follow-up control system for driving an object into positional agreement with a pilot device comprising in combination a pair of electric valves each provided with an anode, a cathode and a control grid, means responsive to positional disagreement of said pilot device and driven object for supplying a signal voltage to said control grid to control the flow of current in the anode circuits of said valves, an electric motor responsive to said current for driving said object toward correspondence with said device, a voltage drop device in circuit with each of said grids, means connected in the armature circuit of said motor and provided with a center tap for producing a voltage proportional to armature current, means for applying a predetermined voltage to said center tap, a second electric valve means having a pair of output circuits each including one of said voltage drop devices and having a pair of control grids connected to terminals of said voltage producing means on opposite sides of said center tap for responding to said armature current to control said pair of electric valves to limit the current supplied to said armature, and means for applying a voltage to the input circuit of said second valve means to bias said second valve means below cutoff by a predetermined amount so that said second valve means is unresponsive to armature currents of less than a predetermined value and said current limiting action is initiated only in response to an armature current equal to said predetermined value.

3. A follow-up control system for driving an object into positional agreement with a pilot device comprising in combination, a two-stage electric valve amplifier having an input circuit and an output circuit, each of said stages comprising a pair of electric valves having anodes, cathodes and control grids, means responsive to positional disagreement of said pilot device and driven object for supplying a signal voltage to said input circuit to control the flow of current in said output circuit, an electric motor responsive to said current for driving said object toward correspondence with said pilot device, a separate voltage drop device connected in circuit with the grid of each of the second stage valves of said amplifier, means connected in the armature circuit of said motor for producing a control voltage proportional to armature current, and additional electric valve means provided with an input circuit connected to said control voltage producing means and with output circuits each including one of said voltage drop devices thereby to control the voltage of the grids of said second stage valves to limit the current supplied to said motor to a predetermined value.

4. A follow-up control system for driving an object into positional agreement with a pilot device comprising in combination a pair of push-pull electric valves provided with an output circuit and with an input circuit for controlling the flow of current in said output circuit, means responsive to positional disagreement of said pilot device and driven object for supplying a signal voltage to said input circuit to cause current to flow in said output circuit, an electric motor responsive to said output current for driving said object toward positional agreement with said pilot device, a voltage drop device connected in the armature circuit of said motor, a second electric valve means provided with an input circuit connected across said voltage drop device and an output circuit connected to the input circuit of said push-pull connected electric valves, and means biasing said second electric valve below cutoff by a predetermined amount thereby to reduce the voltage impressed on the input circuit of said push-pull connected electric valves only in response to a predetermined value of armature current of said motor and to limit the current supplied to said motor to a value having a predetermined relationship to the amount said second valve is biased below cutoff.

5. A follow-up control system for driving an object into positional correspondence with a pilot device comprising in combination a pair of push-pull connected electric valves each provided with an anode, a cathode and a control grid, means responsive to positional disagreement of said pilot device and driven object for supplying a signal voltage to said control grids to cause current to flow in the anode circuit of said valves, an electric motor responsive to said output current for driving said object toward correspondence with said pilot device, a resistor connected in circuit with each of said grids, a center tapped resistor connected in the armature circuit of said motor, means for impressing a predetermined voltage on said center tap, a twin triode electric valve having its anodes connected to the grids of said push-pull connected electric valves and having its grids connected to the opposite terminals of said center tapped resistor, and means biasing said twin triode valve below cutoff by a predetermined amount so as to reduce the voltage impressed on the grids of said push-pull connected electric valves only in response to a predetermined value of armature current of said motor and to limit the current supplied to said motor to a value having a predetermined relationship to the amount said twin triode is biased below cutoff.

SIDNEY GODET.

REFERENCES CITED

The following references are of record in the file of this patent:

UNITED STATES PATENTS

| Number | Name | Date |
|---|---|---|
| 2,040,014 | Moseley | May 5, 1936 |